UNITED STATES PATENT OFFICE.

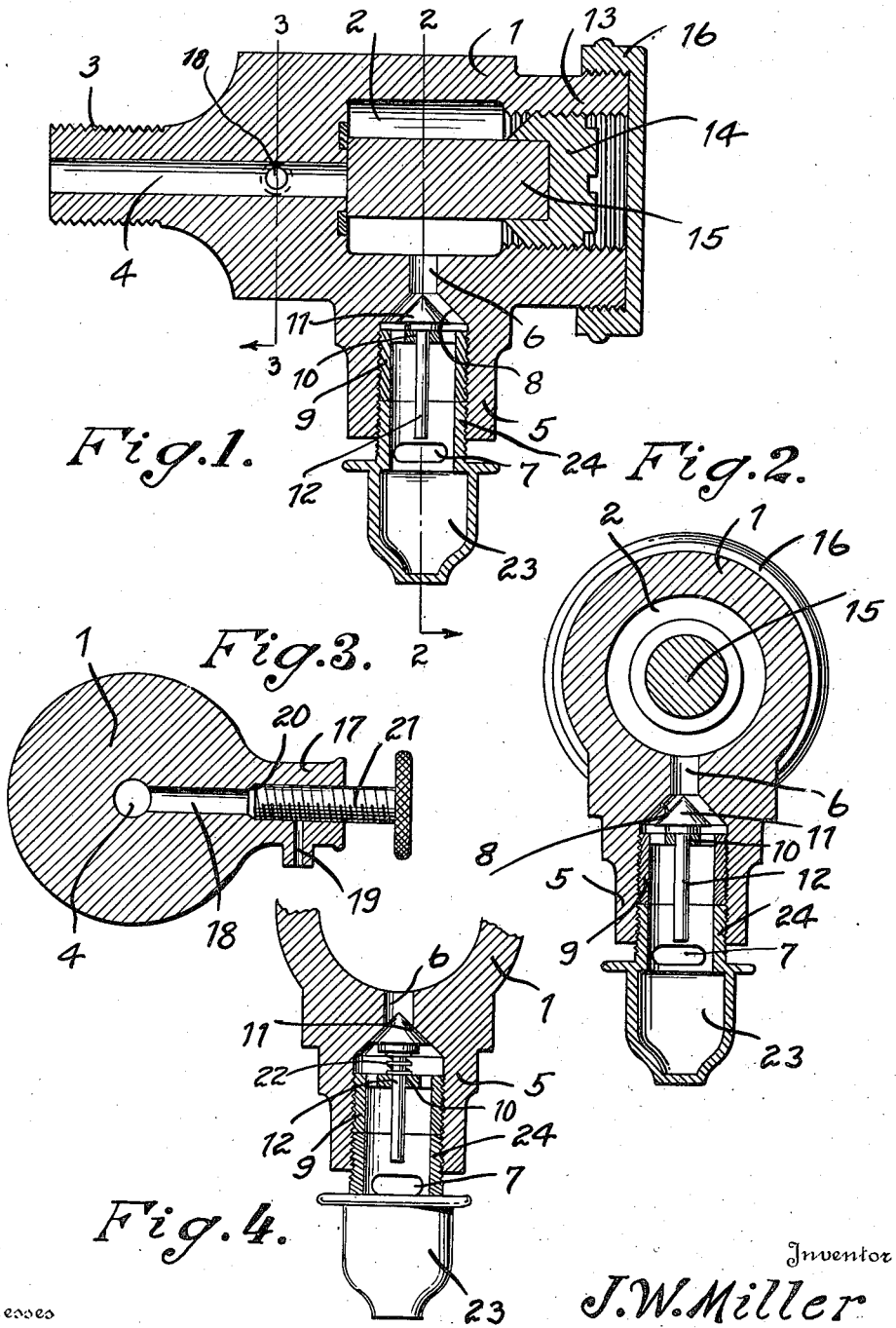

JOHN W. MILLER, OF HARRISBURG, PENNSYLVANIA.

THERMOSTATIC VALVE.

1,188,551. Specification of Letters Patent. Patented June 27, 1916.

Application filed April 10, 1914. Serial No. 831,003.

*To all whom it may concern:*

Be it known that I, JOHN W. MILLER, a citizen of the United States, residing at Harrisburg, in the county of Dauphin, State of Pennsylvania, have invented certain new and useful Improvements in Thermostatic Valves; and I do hereby declare the following to be a full, clear, and exact description of the invention, such as will enable others skilled in the art to which it appertains to make and use the same.

This invention relates to valves and more particularly to the class of thermally operated valves.

The primary object of the invention is the provision of a thermostatic valve which employs an expansible and contractible core which latter is adapted when contracted to permit the expelling of air from a radiator into the atmosphere and also when expanded by the action of the heat in the radiator to close the valve so as to shut off all communication to the atmosphere.

A further object of the invention is to provide for the expelling of air from a radiator while steam is being injected therein and for preventing the air from returning into the radiator when the steam condenses therein.

Another object of the invention is the provision of a device which is automatic in its action.

With these and other objects in view, the invention consists in the combination and arrangement of parts as herein set forth and subsequently claimed.

In the drawing: Figure 1 is a longitudinal sectional view of my device. Fig. 2 is a transverse section on the line 2—2 of Fig. 1. Fig. 3 is a transverse section on the line 3—3 of Fig. 1. Fig. 4 is a sectional view of a modified form of my invention.

Referring to the drawing by reference characters wherein like parts are indicated by like characters, my device comprises a casing 1 having a chamber 2 formed therein. On one end of the casing 1 is an externally threaded shank 3 having an aperture 4 extending therethrough and in communication with the chamber 2.

Extending from the casing 1 at right angles to the shank 3 is an outlet member 5 having an aperture extending longitudinally therethrough and in communication with the chamber 2. This aperture is smaller at the point 6 where it joins the chamber 2 than it is where it communicates with the air at 7 and has therein a valve seat 8. This member 5 is internally threaded and screwed into engagement with these threads is a guide member 9 having an aperture 10 extending through its upper face. In this guide member is mounted a valve 11 having a shank 12 extending through the aperture 10 and being guided thereby. The valve 11 is arranged so that it will seat snugly in the valve seat 8 at the proper time.

In alinement with the shank 3 and extending from the opposite end of the casing 1 is an internally and externally threaded member 13 in which is adjustably mounted a core carrying member 14 on which is mounted a core 15 adapted to be expanded or contracted by action of the steam. This member 15 may be adjusted to any desirable distance from the inner end of the hole 4 so that when it expands it will close the said hole or it may be adjusted so that it will close the said hole when it is in its contracted condition.

Mounted on the external threads on the member 13 is a cap 16 for protecting the member 14 and making the aperture in the said member 13 tight.

Extending outwardly from the casing is a projection 17 having therein a longitudinal hole 18 communicating with the hole 4 in the member 3 and communicating with the hole of the member 17 before mentioned is a radially extending hole 19 which communicates with the atmosphere.

Mounted in the hole 18 and adapted to seat on the valve seat 20 is an adjustable valve 21, the function of which will hereinafter be described.

When steam is let into the radiator, the air therein will be expelled through the hole 4 into the chamber 2 and thence outwardly into the atmosphere through the hole 6, it being understood that the valve 11 previously has been operated by gravity to open the said hole 6, and the core 15 is in its contracted condition. Now after all of the air has been expelled the steam comes in contact with the core 15 and heating the same causes it to expand and closes the inner end of the hole 4, thus stopping the flow of steam therefrom. As the steam condenses in the radiator and the core 15 assumes its contracted condition because of the lack of steam to keep it expanded a vacuum is produced in the radiator and in the chamber 2, thus the tendency of the atmosphere is to rush into the chamber 2 through the hole 6, but this is prevented by the valve 11 which is drawn upwardly by the suction produced by the vacuum in the chamber 2, and thus when steam is again admitted into the radiator it is not necessary to expel air therefrom because of the fact that the valve 11 has maintained a vacuum therein. Should it be desired the valve 11 may be pushed upwardly and seated in the valve seat 8 by a coil spring 22 encircling the shank 12 of the said valve 11, such as shown in Fig. 4 of the drawing. When this valve is operated in this manner the air, on being expelled from the radiator through the aperture 6, pushes the valve 11 outwardly against the action of the spring 22. When the expulsion of air is discontinued by reason of the fact that the hole 4 is closed by the expansion of the core 15, the valve is again seated. The action would be the same thereafter as in the other embodiment of my invention.

It is sometimes desirable to use water in the radiators and when this is done my device may still be of use, for it is only necessary to screw the core carrying member 14 inwardly until the core 15 closes the hole 4 when the core is in its contracted condition. When water is being let into the radiator the air therein is allowed to escape through the hole 18 and the hole 19 which is in communication with the first mentioned hole. After all of the air has been expelled and it is desired to prevent the flow of water from the radiator the adjustable valve 21 is screwed inwardly until it seats in the valve seat 20, thus preventing the water from escaping from the radiator.

Screwed into the lower portion of the member 5 is a drip cup 23 having an upwardly extending threaded shank 24 adapted to engage the threads on the inside of the member 5. I make this member separate from the guide member 9 so that it may be removed when found desirable and may be replaced by a different sized drip cup or even by a pipe to draw water from the device.

From the foregoing description it may be seen that I have provided a device wherein the steam will be prevented from escaping from the radiator by a thermally operated core and air will be prevented from entering the radiator by an automatically operated valve, and I have further provided means wherein the device may be used in connection with the water radiator so that the air may be withdrawn from the same and the water prevented from flowing therefrom.

I do not wish to be limited to the specific embodiment of my invention shown, but only so far as is necessary by the claim.

What is claimed is:—

The combination in an automatic air valve, of a casing having a chamber therein and ports extending from said chamber, automatic means for closing one of said ports, the other of said ports being enlarged and having screw threads therein, a tubular guide member having screw threads thereon engaging the screw threads in the enlarged portion of the port, a check valve carried by the guide member, and a drip cup having a threaded shank extending into the enlarged portion of the port and having screw threads engaging the screw threads in the port whereby the guide member will be locked into position and the cup may be moved independently of the guide member.

In testimony whereof, I affix my signature, in the presence of two witnesses.

JOHN W. MILLER.

Witnesses:
 CHAS. J. BUSH,
 LEWIS H. BOLTON.